United States Patent [19]
Suzuki et al.

[11] Patent Number: 5,622,433
[45] Date of Patent: Apr. 22, 1997

[54] TOP COVER ALONG WITH A TRACK RAIL UNIT AND GUIDE UNIT ON WHICH IT IS EQUIPPED

[75] Inventors: Osamu Suzuki; Kengo Hidano; Takaaki Hagiya, all of Kanagawa, Japan

[73] Assignee: Nippon Thompson Co., Ltd., Tokyo, Japan

[21] Appl. No.: 604,845

[22] Filed: Feb. 22, 1996

[30] Foreign Application Priority Data

Mar. 7, 1995 [JP] Japan .................................. 7-097420

[51] Int. Cl.⁶ ........................................................ F16C 29/06
[52] U.S. Cl. .............................................. 384/45; 384/15
[58] Field of Search .................................. 384/15, 45, 42, 384/44, 49, 50, 55

[56] References Cited

U.S. PATENT DOCUMENTS

| | | | |
|---|---|---|---|
| 4,552,416 | 11/1985 | Lehamann et al. | 384/45 |
| 4,576,420 | 3/1986 | Lehmann et al. | 384/45 |
| 4,828,402 | 5/1989 | Osawa | 384/15 |
| 4,968,155 | 11/1990 | Bode | 384/45 |

FOREIGN PATENT DOCUMENTS

| | | | |
|---|---|---|---|
| 153915 | 7/1991 | Japan | 384/43 |

*Primary Examiner*—Thomas R. Hannon
*Attorney, Agent, or Firm*—Sughrue, Mion, Zinn, Macpeak & Seas

[57] ABSTRACT

A top cover is disclosed that is able to reduce the number of processing steps required for processing and assembly of the entire guide unit into which the top cover itself is included as one of its parts, contribute to reduced costs, facilitate easy attachment and removal to and from a track rail, and be installed on various types of track rails that have already been installed on a machine tool and so forth. In addition, a track rail unit is disclosed that is composed by combining the top cover and track rail, and a guide unit is disclosed that contains the track rail unit.

The above effects are obtained by using fastening member insertion holes formed in a track rail, and employing a top cover having an engaging portion that elastically fits into those insertion holes.

14 Claims, 14 Drawing Sheets

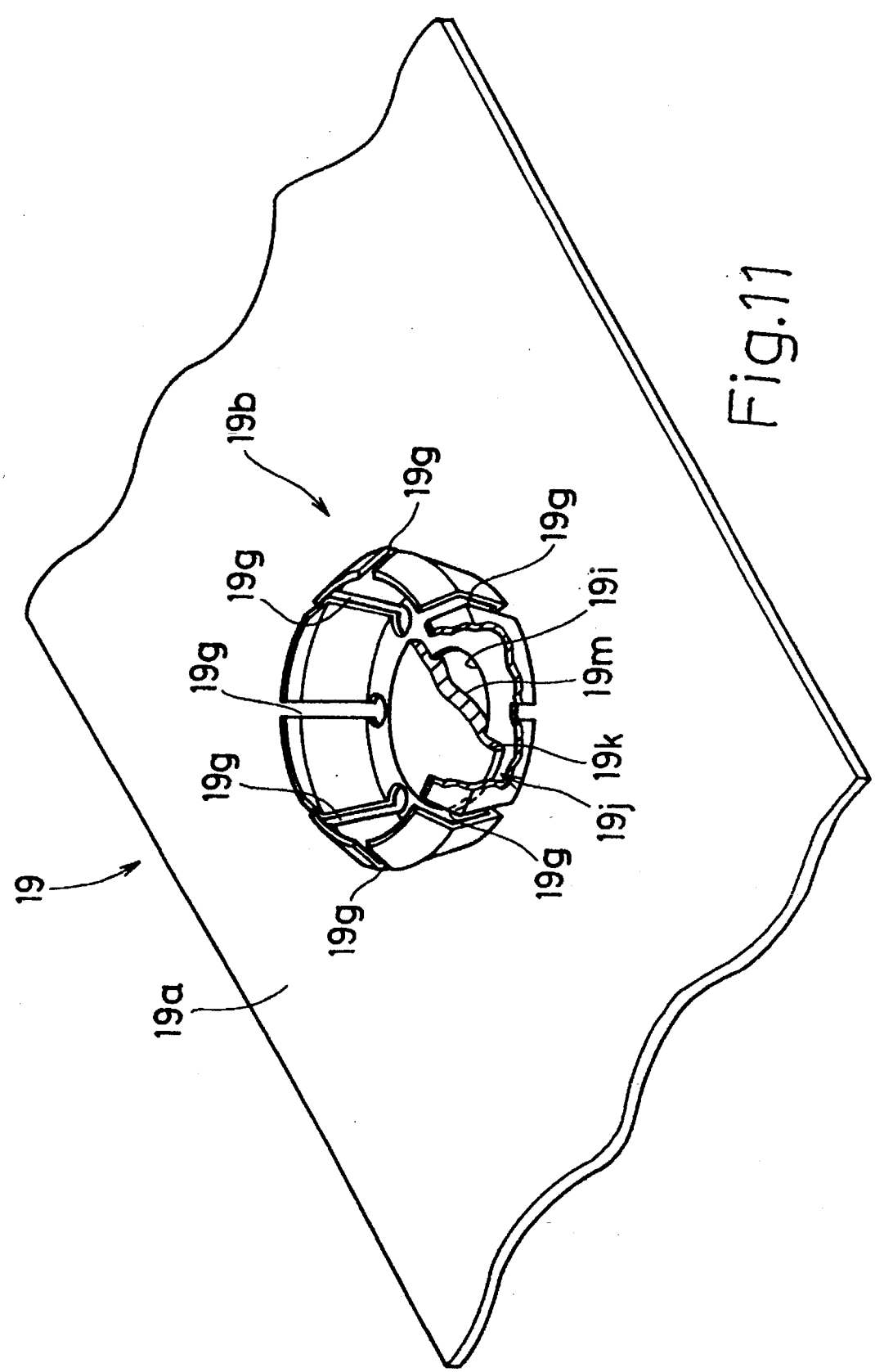

TOP COVER ALONG WITH A TRACK RAIL UNIT AND GUIDE UNIT ON WHICH IT IS EQUIPPED

BACKGROUND OF THE INVENTION

1. Field of the Invention

The present invention relates to a guide unit equipped on a transport mechanism of a machine tool and so forth that guides an object to be moved with high accuracy, and more particularly, to a guide unit that improves dust resistance by blocking the openings of fastening member insertion holes formed in a track rail. In addition, the present invention relates to a track rail unit combining a top cover that covers said fastening member insertion holes and said track rail. Moreover, the present invention relates to said top cover itself.

2. Description of the Prior Art

An example of this type of guide unit of the prior art is a linear motion rolling guide unit shown in FIGS. 1 through 3.

As shown in the drawings, said linear motion rolling guide unit is composed of track rail 1, in which tracks in the form of a pair of track grooves 1a are formed in both the right and left sides along the lengthwise direction, a slider in the form of slide unit 3 having rolling element circulating path 2 (refer to FIGS. 1 and 2; to be described in detail hereinafter) and able to move relative to said track rail 1, and a large number of rolling elements in the form of balls 4, that bear the load between track rail 1 and slide unit 3 by circulating while rolling over the above-mentioned track grooves 1a accompanying movement of slide unit 3, and which are arranged and contained within said rolling element circulating path 2.

The above-mentioned slide unit 3 has casing 6, a pair of end caps 7a and 7b coupled to both ends in the direction of progress of said casing 6, and two seals 8a and 8b attached to the outer surfaces of each of said end caps 7a and 7b. Grease nipple 9 for supplying grease to the above-mentioned balls 4 is attached to one end cap 7a.

As shown in FIG. 2, the above-mentioned rolling element circulating path 2 is composed of a load bearing track in the form of load bearing track groove 2a and return path 2b formed linearly and mutually in parallel in the above-mentioned casing 6, and a pair of roughly semi-circular direction changing paths 2c and 2d which are formed in both end caps 7a and 7b and connect said load bearing track groove 2a and return path 2b at both of their ends. Furthermore, said load bearing track groove 2a corresponds to track groove 1a of track rail 1.

The linear motion rolling guide unit having the above-mentioned constitution is arranged on, for example, a bed equipped on, for example, a machine tool in the form of flat bed 10 (shown in FIG. 3), and track rail 1 is fastened to said bed 10 with a plurality of fastening members in the form of bolts 12 (with hexagon sockets). More specifically, as shown in FIGS. 1 and 3, insertion holes are arranged in a row in the lengthwise direction of track rail 1 such that countersunk portions 1c, having a diameter larger than the heads of said bolts 12, and holes 1d, having a diameter slightly larger than the threaded portions of bolts 12, are mutually concentric, and bolts 12 are inserted and screwed into bed 10 so that their entirety is embedded in said countersunk portions 1c and holes 1d. In addition, as shown in FIGS. 1 and 3, disk-shaped plugs 15 for blocking the openings of the insertion holes are fit onto countersunk portions 1c. The outside surface 15a of this plug 15 is formed to be flat, and lies in the same plane as top surface 1e of track rail 1.

In the linear motion rolling guide unit having the above-mentioned constitution, a table for holding a workpiece (not shown) is bolted to slide unit 3, and this operates as the moving side. Namely, in the state in which a workpiece is placed on said table, said table is, for example, reciprocated by a driving device not shown, and accompanying this reciprocating movement, prescribed work, and more specifically cutting processing, is performed on said workpiece. Furthermore, as shown in FIG. 1, a plurality of threaded holes 6a are formed in the upper surface of casing 6 equipped on slide unit 3, and the above-mentioned table is fastened to said casing by bolts (not shown) that screw into these threaded holes 6a.

In the above-mentioned linear motion rolling guide unit, seals 8a and 8b act to wipe off dust and so forth on track rail 1 during sliding of slide unit 3. In addition, since the openings of insertion holes formed in track rail 1 for insertion of bolts 12 are blocked by plugs 15, retention of dust and so forth in these insertion holes is prevented, and is removed by seals 8a and 8b.

Although said linear motion rolling guide unit has this type of dust prevention function, it is not always easy to perfectly position outside surfaces 15a of the above-mentioned plugs 15 (see FIG. 3) to be in the same plane as top surface 1e of track rail 1. In addition, plugs 15 are gradually pushed down during the time operation of slide unit 3 continues. Thus, it is difficult to reliably avoid the retention of dust and so forth on plugs 15, and the entry of dust into slide unit 3 that slides over said plugs 15 cannot be avoided. In the case dust and so forth enters slide unit 3, together with the risk of damage to the above-mentioned balls 4, rolling element circulating path 2 and track surfaces 1a, the service life of said linear motion rolling guide unit is shortened.

The linear motion rolling guide unit shown in FIGS. 4 and 5 as a second example of the prior art is able to eliminate these problems. Furthermore, said linear motion rolling guide unit is disclosed in Japanese Patent Laid-Open Publication No. 5-16043.

As shown in the drawings, in this linear motion rolling guide unit, since a track rail in the form of linear guide rail 101 is fastened to installation surface 102, rail attachment holes 101a formed in said linear guide rail 101 for insertion of bolts 103, namely insertion holes, are covered by a top cover in the form of rail plate 105. Said rail plate 105 extends along the lengthwise direction of linear guide rail 101, and is mounted on said linear guide rail 101.

The following indicates the constitution of mounting rail plate 105 to linear guide rail 101.

First, fitting groove 101b is formed in the top of linear guide rail 101 along its lengthwise direction, and rail plate 105 fits into this fitting groove 101b. Said rail plate 105 and fitting groove 101b have a roughly trapezoidal shape with respect to the perpendicular cross-section in the lengthwise direction. As a result, rail plate 105 is prevented from coming out in the upward direction.

In addition, rail plate 105 is mounted on linear guide rail 101 by hook piece 107 and screw 108 at both ends in its lengthwise direction. More specifically, locking hole 105a and indented locking edge 105b are formed on both ends of rail plate 105, and hook edge 107a is hooked on said locking edge 105b by hook piece 107 having said hook edge 107a and an L-shaped cross-section, and fastened to the end of linear guide rail 101 by screw 108.

As a result of providing the above-mentioned rail plate 105, the rail upper surface over which a slider in the form of linear slider 110 slides is made completely smooth. For this reason, dust and so forth that has fallen onto or adhered to said rail upper surface is reliably removed by scraper 111 provided on both ends in the direction of progress of said linear slider 110, thus preventing entry into said linear slider 110. This type of constitution is preferably used in machinery operating in environments particularly in which there is generation of large amounts of dust and so forth, such as machine tools (cutting machines, grinding machines, etc.), woodworking machines and cutters. Furthermore, examples of dust and so forth include metal cuttings represented by iron and alumina cuttings, and wood chips and so forth produced during woodworking.

Since the above-mentioned rail plate 105 is mounted on linear guide rail 101 in the above-mentioned linear motion rolling guide unit, while fitting groove 101*b* is formed having a trapezoidal cross-section in said linear guide rail 101, hook piece 107 and screw 108 are used as fasteners. Moreover, a female threaded portion for screwing in this screw 108 is formed in the end of linear guide rail 101.

Thus, in the case of this constitution in which a long groove and female threaded portion are formed in the guide rail itself while also requiring the use of fasteners, the number of steps required for processing and assembly becomes large and the scale of the processing work is also large, thus inviting increased costs. In addition, according to the above-mentioned constitution, in the case of fabricating linear motion rolling guide units of various lengths, various rail plates each having the above-mentioned locking hole 105*a* and locking edge 105*b* must be made available corresponding to each of the end positions of these linear guide rails of different lengths, thus resulting in the problem of an increase in the number of processing steps making it difficult to reduce costs.

In addition, in the case it becomes necessary to replace the above-mentioned rail plate 105 as a result of being damaged by some cause, together with having to remove each of the above-mentioned fasteners, rail plate 105 must be pulled out in the lengthwise direction from fitting groove 101*b* of linear guide rail 101 (since it cannot be lifted out due to the roughly trapezoidal shape of its cross-section), after which a new one must be installed by following the reverse procedure. Thus, a considerable amount of processing steps are required during replacement, and this replacement work is bothersome for a worker.

In addition, since the above-mentioned rail plate 105 and linear guide rail 101 are mutually fit together, they cannot be treated as individual products, thus making it difficult to use only rail plate 105 for other types of guide rails in which this fitting groove portion is not formed.

SUMMARY OF THE INVENTION

In consideration of the above-mentioned disadvantages of the prior art, the object of the present invention is to provide a top cover that is able to reduce the number of processing steps required for processing and assembly of the entire guide unit into which said top cover itself is included as one of its parts, contribute to reduced costs, facilitate easy attachment and removal to and from a track rail, and be installed on various types of track rails that have already been installed on a machine tool and so forth.

In addition, the object of the present invention is also to provide a track rail unit that combines said top cover and a track rail, as well as provide the above-mentioned guide unit that contains said track rail unit.

The top cover according to the present invention is composed of a body portion extending along the lengthwise direction of a track rail that covers insertion holes formed in said track rail for insertion of fastening members for fixing on a prescribed base, and an engaging portion that engages with said insertion holes to mount said body portion on said track rail.

In addition, the track rail unit according to the present invention is composed of a track rail in which a track is formed along the lengthwise direction and in which insertion holes for insertion of fastening members for fixing on a prescribed base are arranged in a row in the lengthwise direction, and a top cover comprising a body portion extending along the lengthwise direction of said track rail that covers said insertion holes, and an engaging portion that engages with said insertion holes to mount said body portion on said track rail.

Moreover, the guide unit according to the present invention is composed of a track rail, in which a track is formed along the lengthwise direction and in which insertion holes for insertion of fastening members for fixing on a prescribed base are arranged in a row in the lengthwise direction, a slider able to perform relative movement with respect to said track rail, and a top cover comprising a body portion extending along the lengthwise direction of said track rail that covers said insertion holes, and an engaging portion that engages with said insertion holes to mount said body portion on said track rail.

According to the above-mentioned constitution, the top cover is mounted on the track rail by engaging the engaging portion of the top cover with fastening member insertion holes formed in the track rail.

BRIEF DESCRIPTION OF THE DRAWINGS

FIG. 10(*b*) is a front view in partial section of the engaging portion of FIG. 10(*a*);

FIG. 10(*c*) is a bottom view of the engaging portion of FIG. 10(*a*);

FIG. 11 is a perspective view, including a partial cross-section, of a portion of the top cover that is an essential portion of a linear motion rolling guide unit as a second embodiment of the present invention.

DESCRIPTION OF THE PREFERRED EMBODIMENTS

Figure 1:
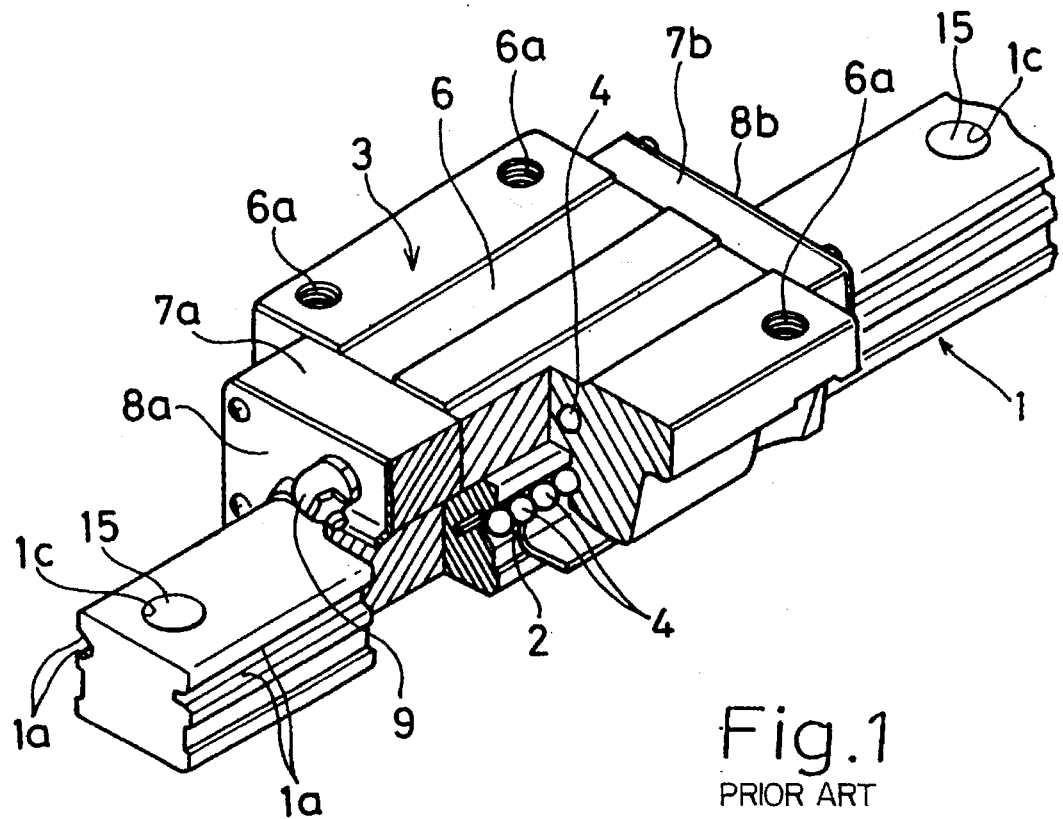
FIG. 1 is a perspective view, including a partial cross-section, of the essential portion of a linear motion rolling guide unit as a first example of the prior art.
Figure 2:
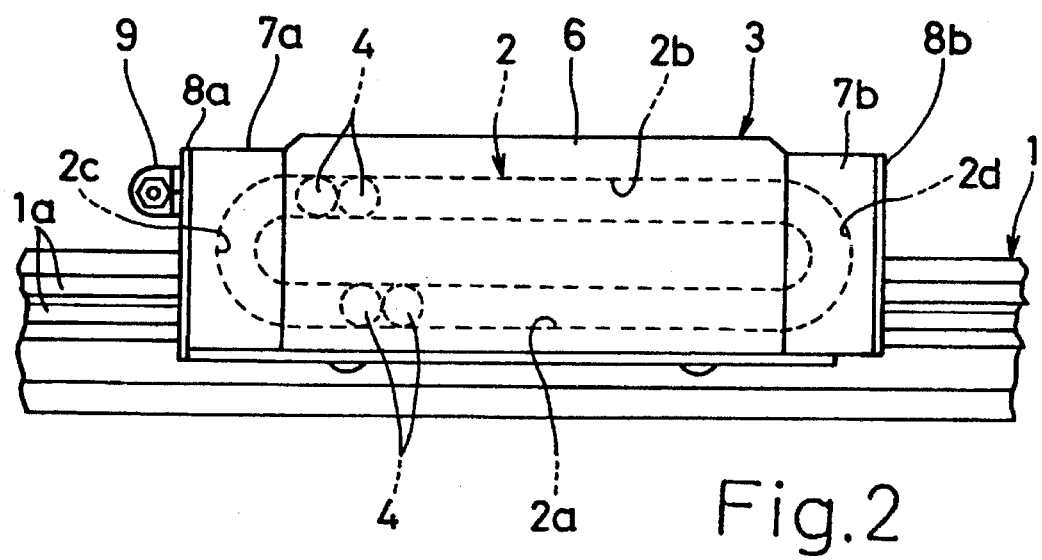
FIG. 2 is a front view of the constitution shown in FIG. 1.
Figure 3:
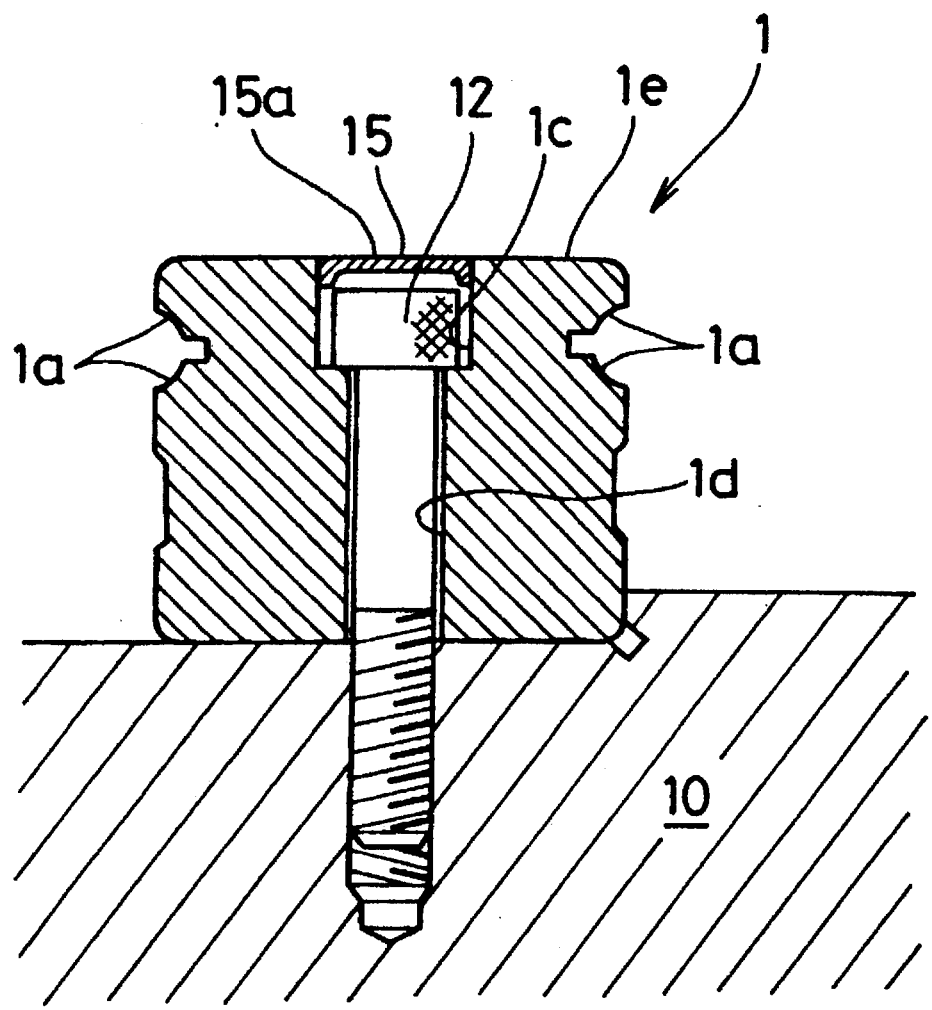
FIG. 3 is a vertical cross-sectional view showing a track rail equipped on the linear motion rolling guide unit shown in FIGS. 1 and 2 installed on a bed.
Figure 4:
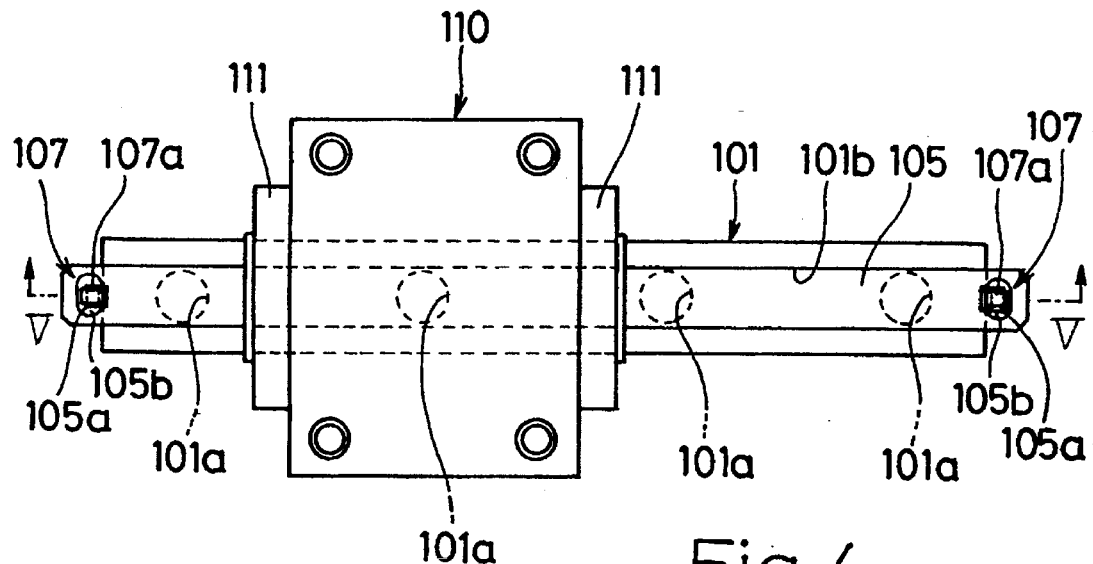
FIG. 4 is an overhead view of a linear motion rolling guide unit as a second example of the prior art.
Figure 5:
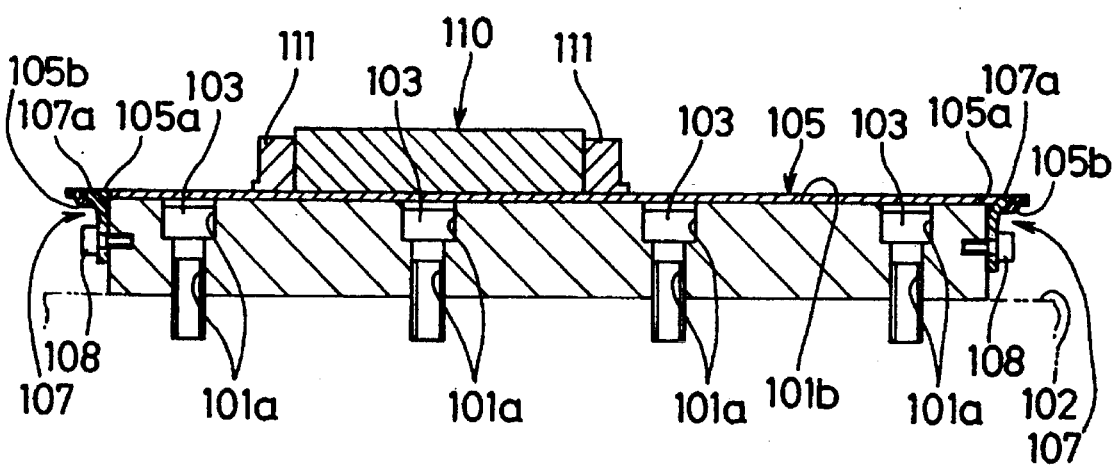
FIG. 5 is a view taken along arrows V—V relating to FIG. 4.

The following provides an explanation of the embodiments of the present invention with reference to the attached drawings. First, an explanation is provided regarding a guide unit as a first embodiment of the present invention, and in the case of this explanation, a linear motion rolling guide unit based on FIGS. 6 through 10. Furthermore, since those portions other than the essential portions explained below are composed in the same manner as the first example of a linear motion rolling guide unit of the prior art shown in FIGS. 1 through 3, an explanation of said portions in the guide unit is omitted. In addition, in the following explanation, the same reference numerals will be used for those constituent portions that are identical to the constituent portions of said linear motion rolling guide unit of the prior art. In addition, said portions will be similarly omitted with respect to other embodiments to be described later, and explanations will only be provided for essential portions.

Figure 6:
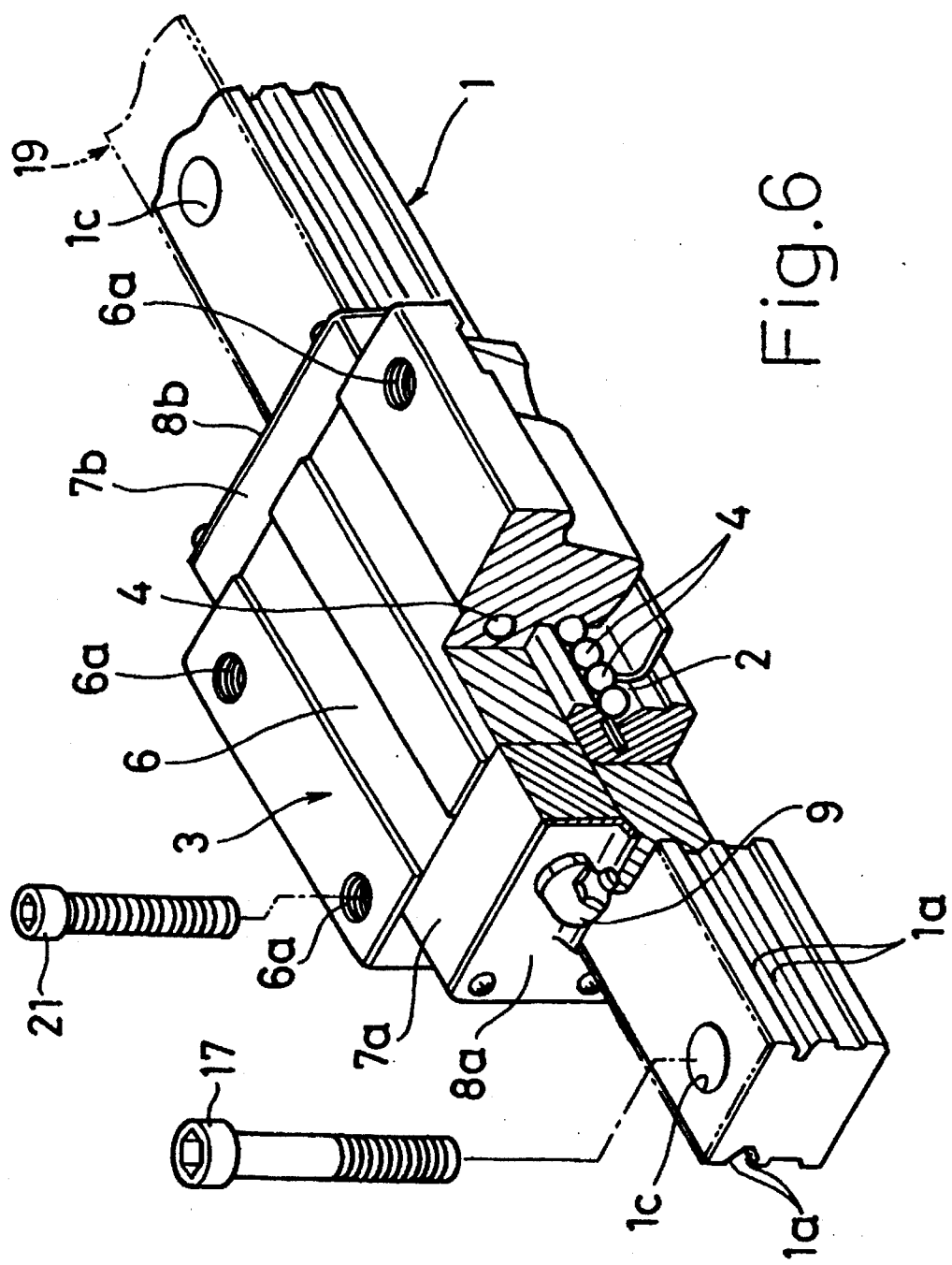
FIG. 6 is a perspective view, including a partial cross-section, of the essential portion of a linear motion rolling guide unit as a first embodiment of the present invention.
Figure 7:
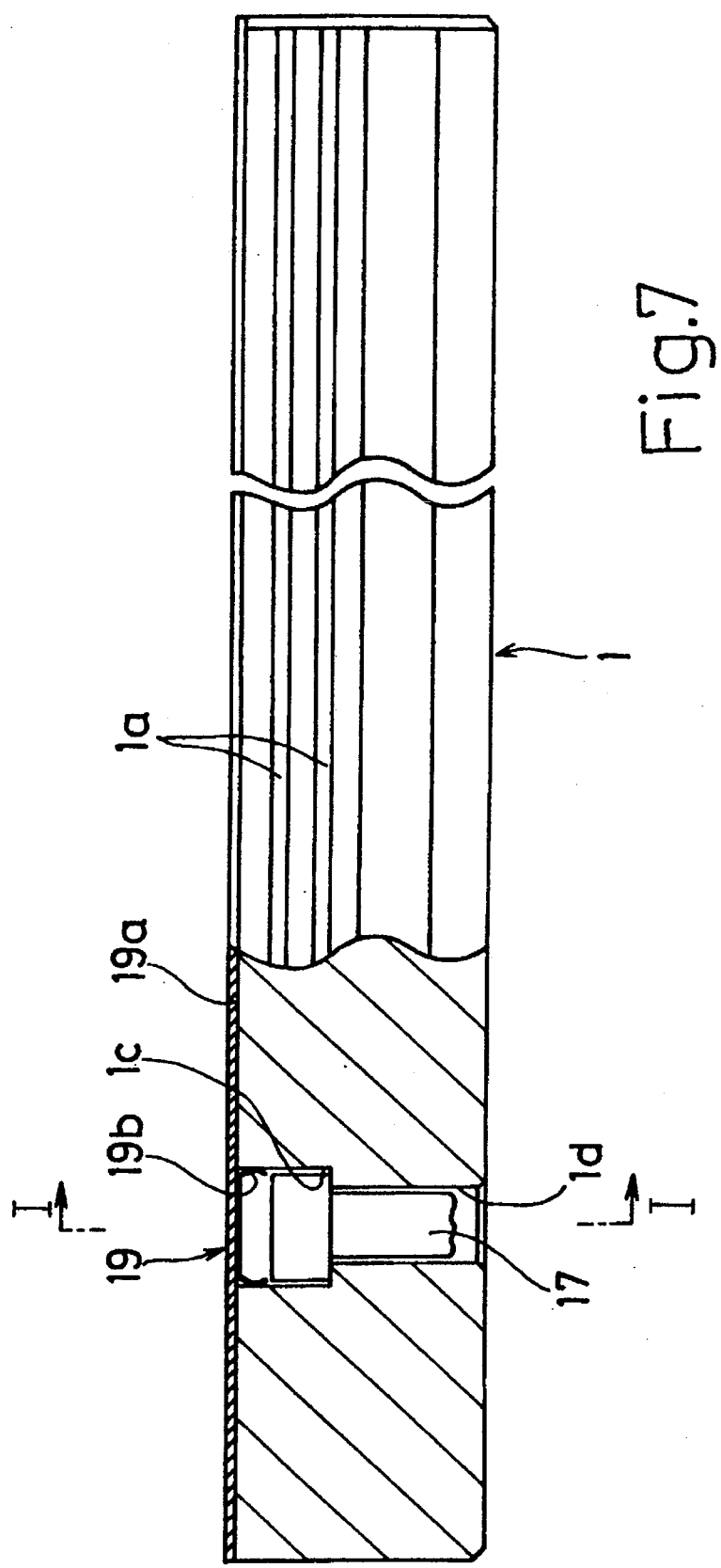
FIG. 7 is a front view, including a partial cross-section, of a track rail unit equipped on the linear motion rolling guide unit shown in FIG. 6.
Figure 8:
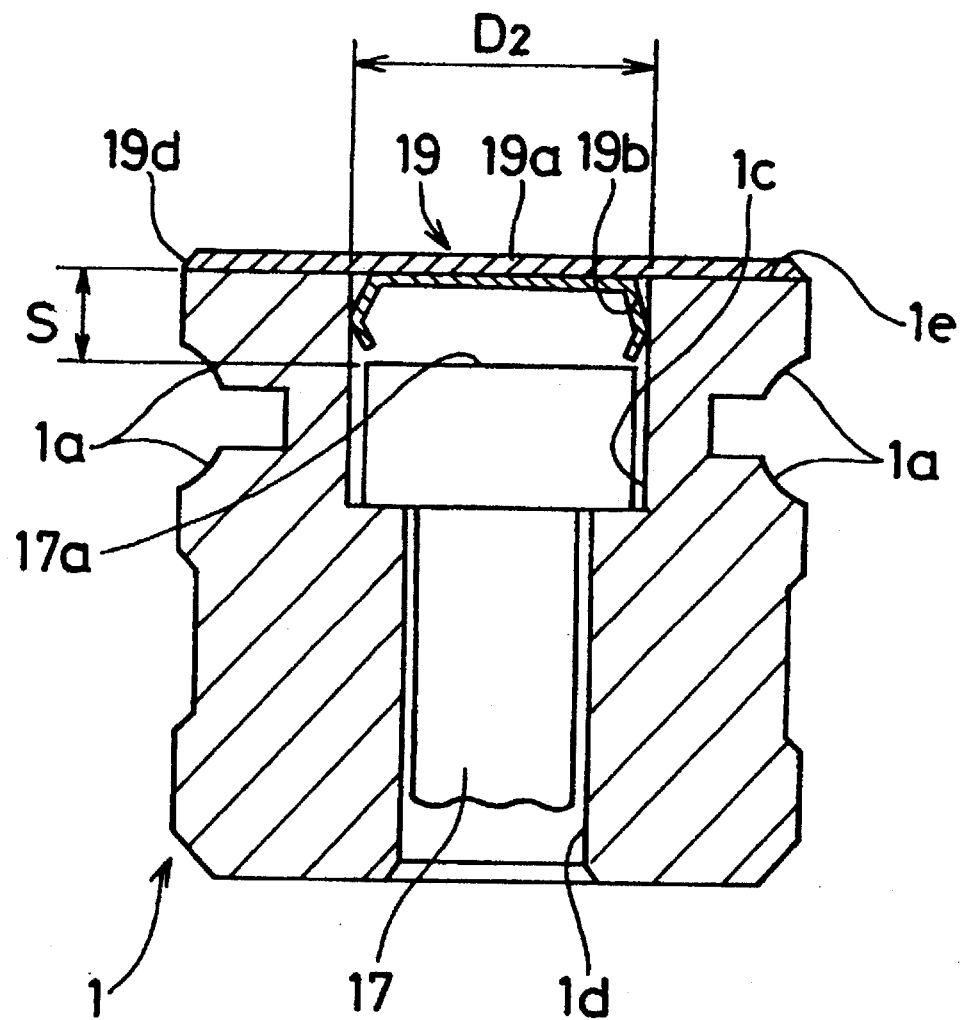
FIG. 8 is a view taken along arrows I—I relating to FIG. 7.

As shown in FIGS. 6 through 8, in the linear motion rolling guide unit as claimed in the present invention, insertion holes (countersunk portions 1c and holes 1d), into which bolts 17 are inserted for fixing track rail 1 to a prescribed base (bed 10 and so forth shown in FIG. 3), are formed in said track rail 1 and covered by top cover 19. Furthermore, this constitution composed of this top cover 19 and track rail 1 is generically referred to as a track rail unit. The other bolts 21 shown in FIG. 6 are for fastening a table (not shown) to slide unit 3.

Figure 9:
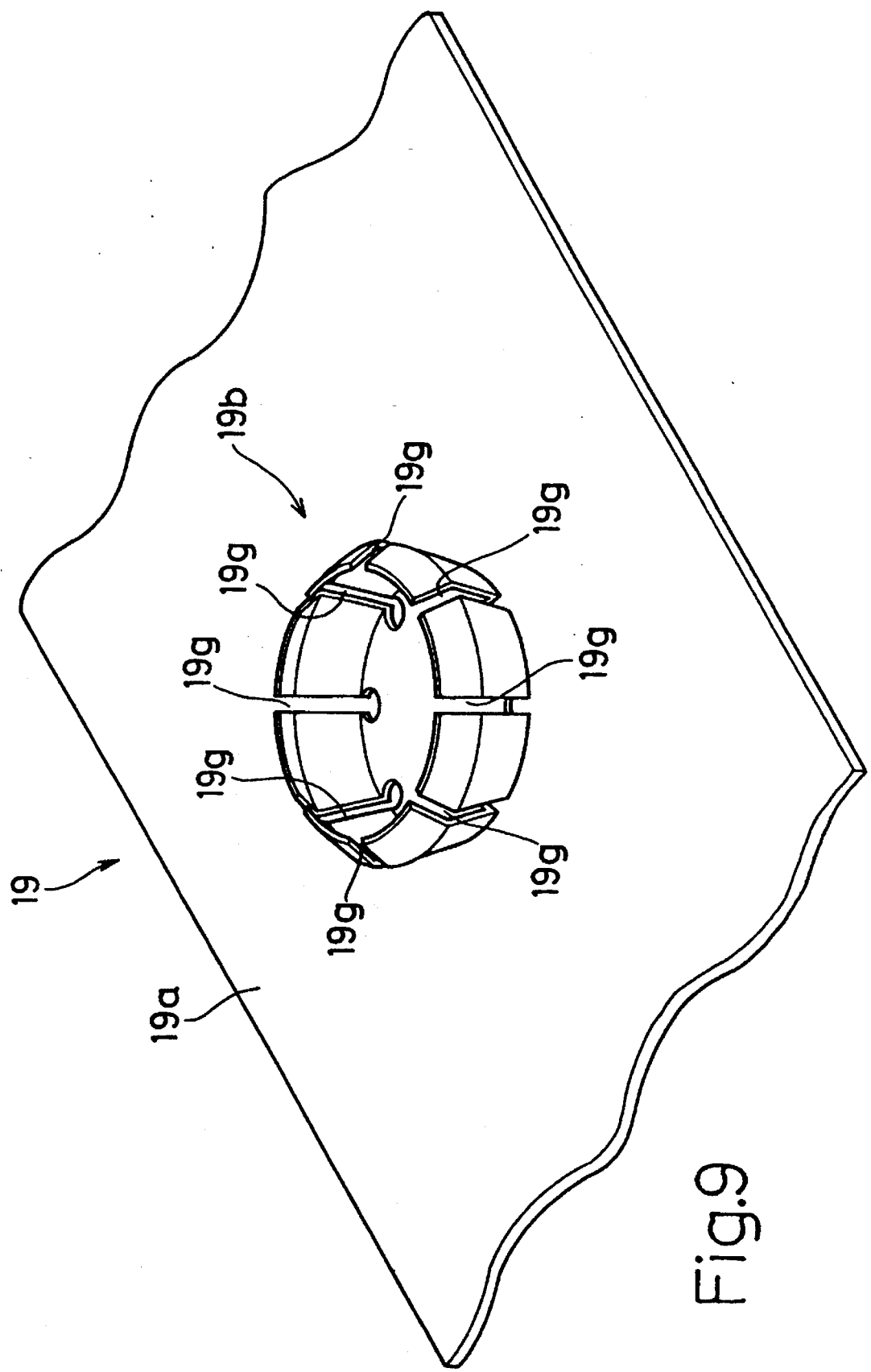
FIG. 9 is a perspective view of a portion of a top cover equipped on the linear motion rolling guide unit shown in FIG. 6.

As can be seen from FIGS. 7 through 9, the above-mentioned top cover 19 is composed of body portion 19a in the form of a long, rectangular, thin plate that extends along the lengthwise direction of track rail 1, and engaging portion 19b that engages with the above-mentioned insertion holes and mounts said body portion 19a to track rail 1. Said body portion 19a of the present embodiment has a length that extends over the entire length of track rail 1, and covers the entire width of the top surface of track rail 1. Furthermore, FIG. 9 shows the state when viewing top cover 19 from one engaging portion 19b.

In said linear motion rolling guide unit, as a result of engaging engaging portion 19b of top cover 19 with insertion holes formed for insertion of fastening members (bolts 17) in track rail 1, top cover 19 is mounted to track rail 1. Namely, a constitution is employed wherein mounting of top cover 19 is performed by utilizing the fastening member insertion holes of track rail 1. For this reason, processing for attaching a top cover is not required at all for track rail 1, and fasteners and adhesive for attaching the top cover are also not required, thus allowing the number of steps required for processing and assembly to be reduced resulting in decreased costs.

In addition, according to the above-mentioned constitution, in the case of fabricating linear motion rolling guide units of various lengths, by preparing in advance a long top cover in which a large number of the above-mentioned engaging portions 19b are arranged in a row and then suitably cutting into lengths of the track rails equipped on each linear motion rolling guide unit to be fabricated, there is no need to individually fabricate various top covers of different lengths. The number of processing steps and costs are also reduced with respect to this point.

Moreover, according to the above-mentioned constitution, in the case it becomes necessary to replace top cover 19 already installed on track rail 1 due to being damaged by some cause, said top cover 19 can be removed from track rail 1 by lifting up said top cover 19 such that engaging portions 19b of said top cover 19 are pulled out of the insertion holes of track rail 1, while a new top cover 19 can be attached by using the reverse procedure, namely by inserting the engaging portions 19b into the above-mentioned insertion holes, to complete the replacement procedure. Thus, replacement can be performed both easily and rapidly.

In addition, since top cover 19 of the above-mentioned constitution can be installed on track rail 1 as described above without requiring any special processing, it can be installed later on the above-mentioned track rail already installed on a machine tool and so forth. In addition, since top cover 19 is in the form of a thin plate, even if there are changes in the upper surface of the track rail, these changes are allowed by the elastic deformation of the lip portions of seals 8a and 8b provided on slide unit 3 (see FIG. 6), thus preventing obstruction of the sliding movement of slide unit 3.

Furthermore, in the present embodiment, although top cover 19 extends over the entire length and width of track rail 1, it is only required to at least cover a prescribed portion that contains fastening member insertion holes formed in track rail 1, and therefore the present embodiment does not limit the length and width of top cover 19. In addition, as was previously described, although the above-mentioned top cover 19 does not require any special processing in track rail 1, depending on the case, a groove in the lengthwise direction may be formed in the top of track rail 1 and said top cover 19 may be fit into said groove in embedded fashion. In addition, although engaging portion 19b of the above-mentioned top cover 19 is mounted to body portion 19a of top cover 19 at prescribed intervals corresponding to the above-mentioned insertion holes formed in track rail 1, that interval may be for every other insertion hole, or in extreme cases, extend only between both ends.

Continuing, the following provides a more detailed explanation of body portion 19a and engaging portion 19b that compose top cover 19.

First, in the case of the present embodiment, the material that is used for said body portion 19a and engaging portion 19b is metal, and specifically steel, alloy steel or non-ferrous metal. In the case of a steel-based metal, stainless steel is used due to its corrosion resistance, while aluminum is preferably used in the case of a non-ferrous metal. In addition, with respect to the plate thickness of body portion 19a, since it is necessary to ensure a certain degree of mechanical strength, extremely thin plates should be avoided, while that having a thickness of, for example, roughly 0.1 mm, can be used, while the upper limit for use is considered to be roughly 2–3 mm.

As is clear from FIG. 8, beveling 19d is performed over the entire length of both the left and right sides of the above-mentioned body member 19a.

Figure 10A:
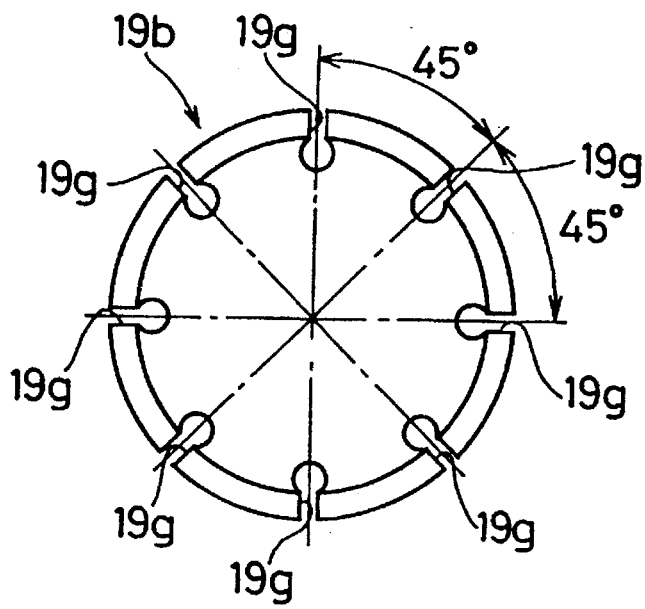
FIG. 10(*a*) is an overhead view of an engaging portion that serves as a portion of the top cover shown in FIG. 9.
Figure 10B:
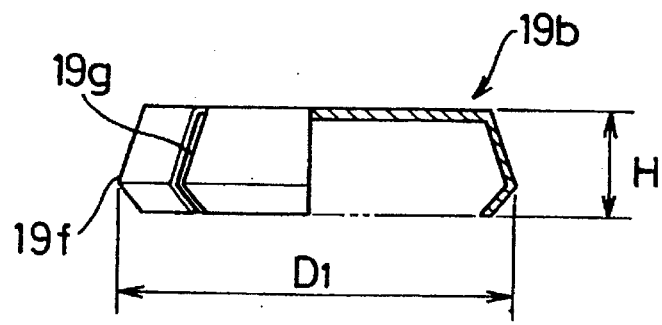
Figure 10C:
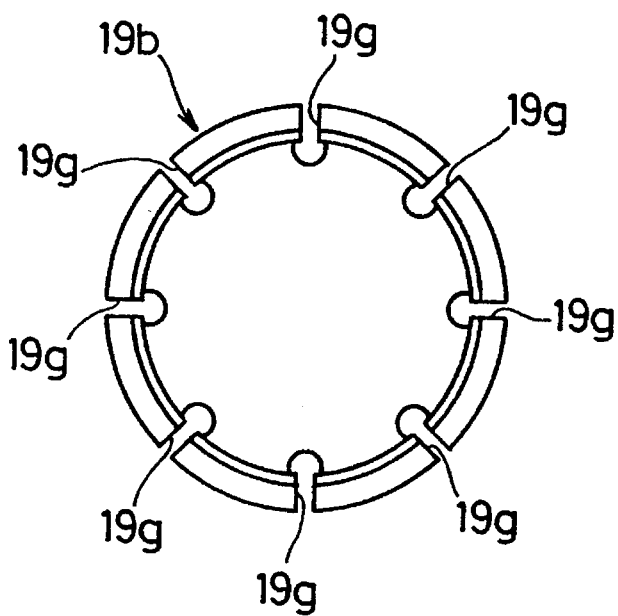

FIGS. 10 (a) through (c) are an overhead view, front view including a partial cross-section, and bottom view of the above-mentioned engaging portion 19b, respectively. As shown in FIGS. 10 and 9, engaging portion 19b is roughly in the shape of a cylinder with its one end being closed, and together with the diameter gradually increasing from its closed end towards its open end, said diameter gradually becomes narrower starting from a prescribed location 19f (see FIG. 10(b)) so that outer diameter $D_1$ of said prescribed location 19f is larger than inner diameter $D_2$ of the insertion holes (countersunk portions 1c which are a portion of them) of track rail 1. A plurality, in this case eight, of slits 19g are arranged in a row at equal pitch (45°) in the circumferential direction in engaging portion 19b that open towards above-mentioned open end in parallel with the axial direction. Engaging portion 19b of said form can be easily fabricated by press processing using various materials such as thin sheet steel, which together with realizing low costs, enables resilient engaging strength to be easily obtained with respect to the above-mentioned insertion holes.

Thus, although the above-mentioned engaging portion 19b has a diameter larger than the insertion holes of track Pail 1, it is able to be elastically deformed freely due to the presence of the above-mentioned slits 19g, thus enabling it to fit into said insertion holes. Thus, mounting of top cover 19 to track rail 1 is relatively rigid, and prevents said top cover 19 from being released despite the application of a certain degree of vibrations and impact.

As can be seen from FIG. 8, the above-mentioned engaging portion 19b is juxtaposed between top surface 17a of bolt 17 inserted into the insertion hole (countersunk portion 1c and hole 1d) of track rail 1 and the surface of said track rail 1, in this case the location of top surface 1e. Consequently, the height dimension H of said engaging portion 19b (see FIG. 10(b)) is set to be slightly smaller than the distance S between top surfaces 17a and 1e of bolt 17 and track rail 1, respectively. Namely, in the state in which bolt 17 is inserted in the above-mentioned insertion hole, since the space that forms as the above-mentioned so-called plug space in said insertion hole is used as space for containing the above-mentioned engaging portion 19b, processing for additionally expanding the diameter, depth and so forth of said insertion hole (countersunk portion 1c) is not required, thus eliminating the incurrence of costs with respect to this point as well.

The above-mentioned engaging portion 19b is formed separately from body portion 19a in the form of a thin plate, and is attached to said body portion 19a. More specifically, the closed end of engaging portion 19b is mounted on body portion 19a by welding such as spot welding and laser welding, or by using a relatively powerful adhesive. According to this constitution, since body portion 19a and engaging portion 19b are coupled after forming said body portion 19a and engaging portion 19b as separate parts, although the number of fabrication steps increases slightly, since each part has a simple shape and their respective formation is extremely simple, production can be performed with small-scale equipment.

Furthermore, in the present embodiment, although body portion 19a and engaging portion 19b of top cover 19 are formed separately and then mutually coupled as described above, they may also be formed in the manner described below.

Namely, body portion 19a and engaging portion 19b of top cover 19 may be molded as a single unit by a molding apparatus using synthetic resin. In this constitution, the top cover can be formed all at once, thus resulting in a significant reduction in the number of fabrication steps. Furthermore, even in the case of molding with synthetic resin, body portion 19a and engaging portion 19b can naturally also be molded separately. In addition, the shape of engaging portion 19b is not limited to that of the above-mentioned embodiment, but rather various forms can naturally also be considered according to the conditions of use and so forth.

Continuing, the following provides an explanation of a top cover that is an essential portion of a linear motion rolling guide unit as a second embodiment of the present invention based on FIGS. 11 and 12. Furthermore, as was previously stated, since this linear motion rolling guide unit as a second embodiment of the present invention is composed in the same manner as the example of a linear motion rolling guide unit of the prior art shown in FIGS. 1 through 3 with the exception of the top cover explained below, an explanation of said linear motion rolling guide unit is omitted.

Figure 12A:
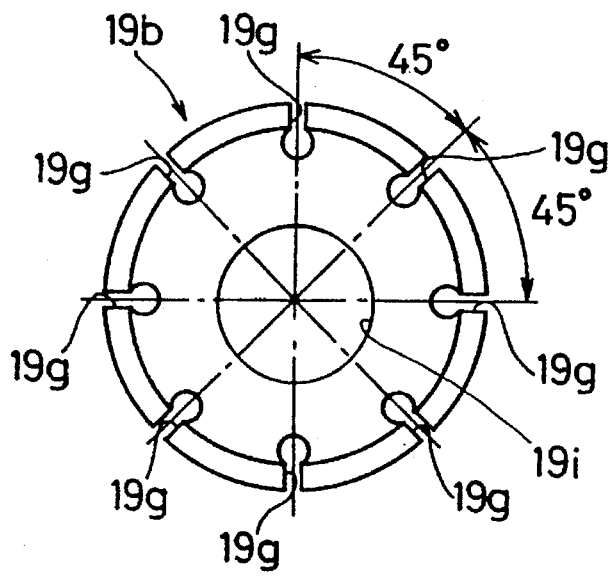
FIG. 12(a) is an overhead view of an engaging portion that serves as a portion of the top cover shown in FIG. 11.
Figure 12B:
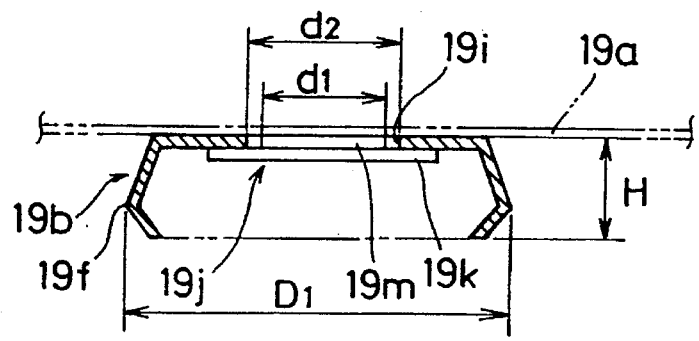
FIG. 12(b) is a front cross-sectional section of the engaging portion of FIG. 12(a)
Figure 12C:
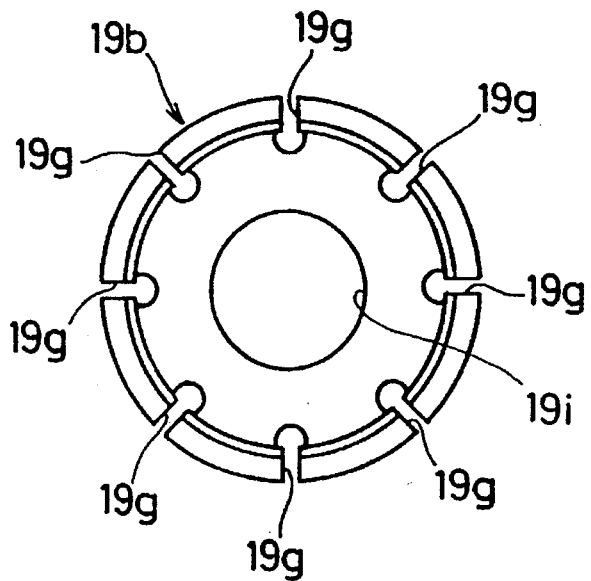
FIG. 12(c) is a bottom view of the engaging portion of FIG. 12(a)

FIG. 11 shows the state in which said top cover 19 is viewed from one engaging portion 19b. In addition, FIGS. 12(a) through (c) are an overhead view, vertical cross-sectional view and bottom view of engaging portion 19b equipped on said top cover 19, respectively. As can be seen from these drawings, for example circular hole 19i is formed in the closed end of engaging portion 19b. As shown in FIGS. 11 and FIG. 12(b), engaging portion 19b is attached to body portion 19a by circular rivet 19j inserted into said hole 19i.

The above-mentioned rivet 19j has large diameter portion 19k and small diameter portion 19m, said small diameter portion 19m is inserted into the above-mentioned hole 19i, and supports engaging portion 19b with large diameter portion 19k. As shown in FIG. 12(b), diameter $d_1$ of said small diameter portion 19m is set to be smaller than inner diameter $d_2$ of hole 19i into which it is inserted. As a result, the above-mentioned engaging portion 19b is able to move slightly ($d_2$–$d_1$) in the lengthwise direction and width direction of said body portion 19a. However, it may also be moved only in one of said lengthwise or width directions as necessary. Since engaging portion 19b is able to move with respect to body portion 19a, even in the case there is a relatively large error in the pitch and so forth between each insertion hole (countersunk portion 1c and hole 1d) arranged in a row in track rail 1 (see FIGS. 6 through 8), each engaging portion 19b can be fit into each insertion hole as a result of being guided by said insertion holes due to each engaging portion 19b being able to move as described above, thus preventing the occurrence of defective fitting.

Figure 13:
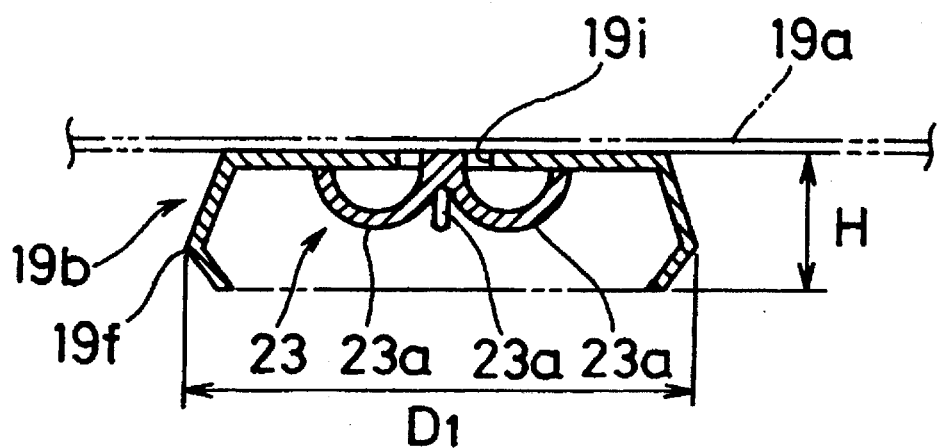
FIG. 13 is a vertical cross-sectional view showing a variation of the engaging portion shown in FIG. 12.

The rivet for attaching the above-mentioned engaging portion 19b to body portion 19a so as to be able to move slightly with respect to said body portion 19a is not limited to that of the above-mentioned constitution, but rather various other forms can be applied. A specific example is rivet 23 shown in FIG. 13. This rivet 23 supports engaging portion 19b by equally arranging, for example, four flexible portions 23a formed by bending into the shape of an arc, and using the resiliency of each of said flexible portions 23a.

Furthermore, simultaneous to one end of each of the types of rivets being fastened to the above-mentioned body portion 19a by means of welding and so forth, it is formed into a prescribed shape by hot or cold processing.

Figure 14:
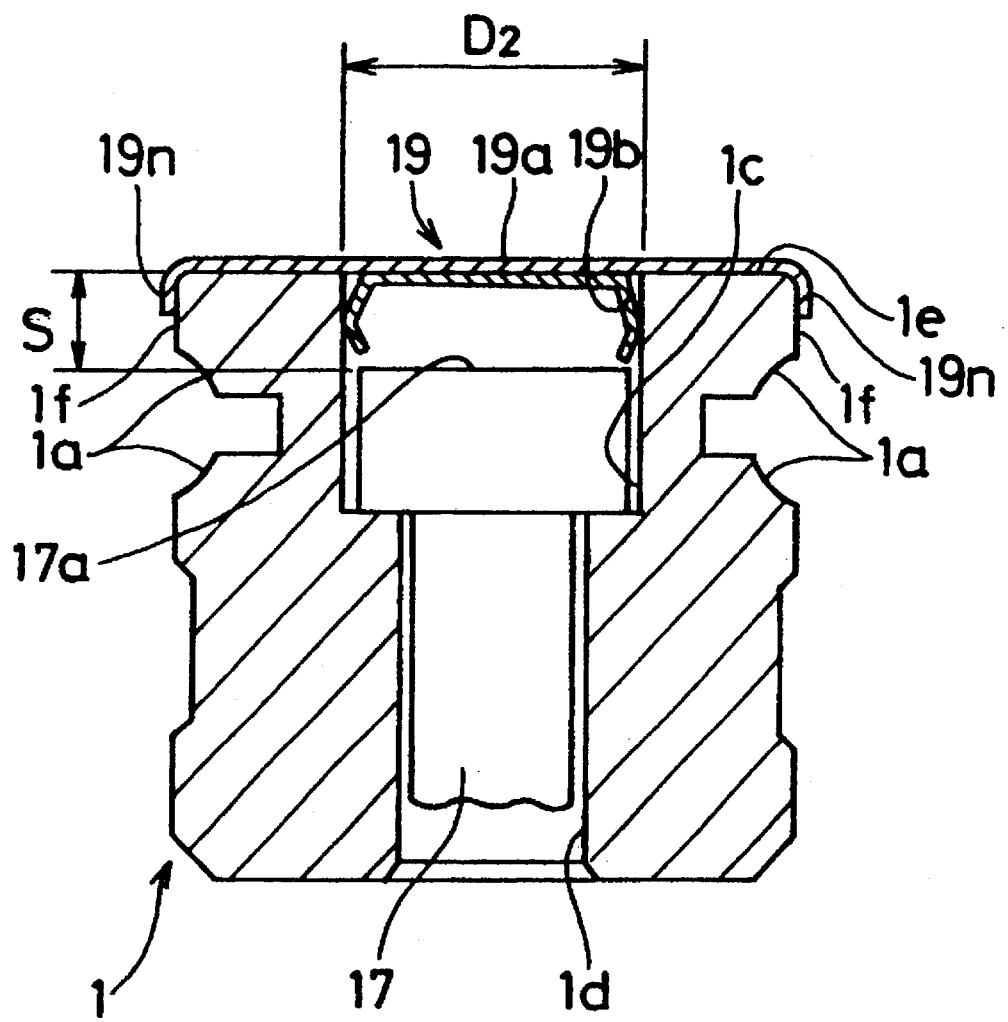
FIG. 14 is a vertical cross-sectional view of a track rail and top cover that are essential portions of a linear motion rolling guide unit as a third embodiment of the present invention.

Next, the following provides an explanation of the essential portion of a linear motion rolling guide unit as a third embodiment of the present invention with reference to FIG. 14.

As shown in the drawing, in the present embodiment, body portion 19a of top cover 19 has bent extending portion 19n extending from both side edges of top surface 1e of track rail 1 to the upper portion of side surface 1f. This bent extending portion 19n is formed over the entire length of said body portion 19a. As a result of providing this bent extending portion 19n, entry of dust and so forth from both sides of top cover 19 is prevented, thereby improving dust prevention effects.

With respect to top cover 19 equipped on the linear motion rolling guide units of each of the embodiments described above, the surface of body portion 19a of said top cover 19 may be colored with a desired color. If top cover 19 is made of metal, it is preferable to form an oxidized film of a desired color with, for example, electrolytic chemical coloring. Alternatively, in the case of a top cover made of synthetic resin, it may be molded using a material of the desired color. In this manner, by coloring the surface of body portion 19a of top cover 19, in addition to obtaining an attractive appearance, the additional effect is obtained wherein different types of top cover 19 can be distinguished by color coding.

Figure 15:
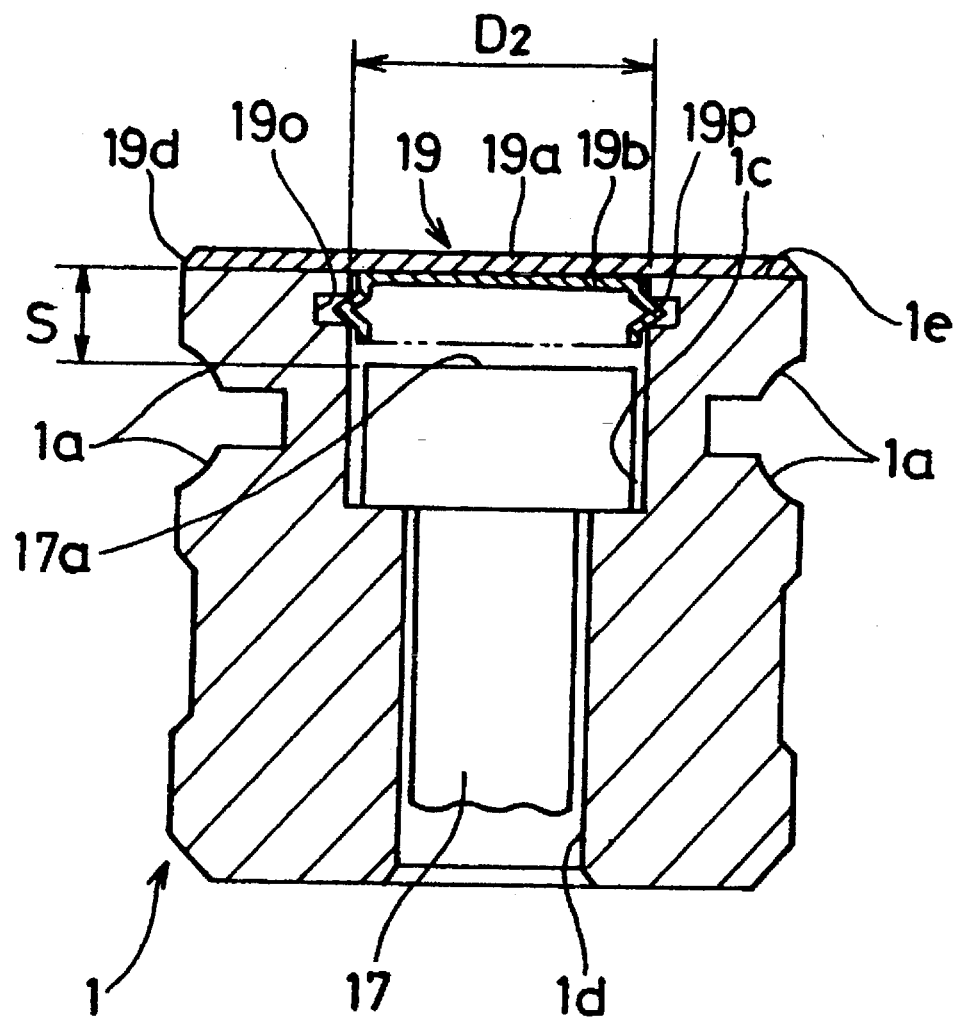
FIG. 15 is a vertical cross-sectional view of a track rail and top cover that are essential portions of a linear motion rolling guide unit as a fourth embodiment of the present invention.
Figure 16:
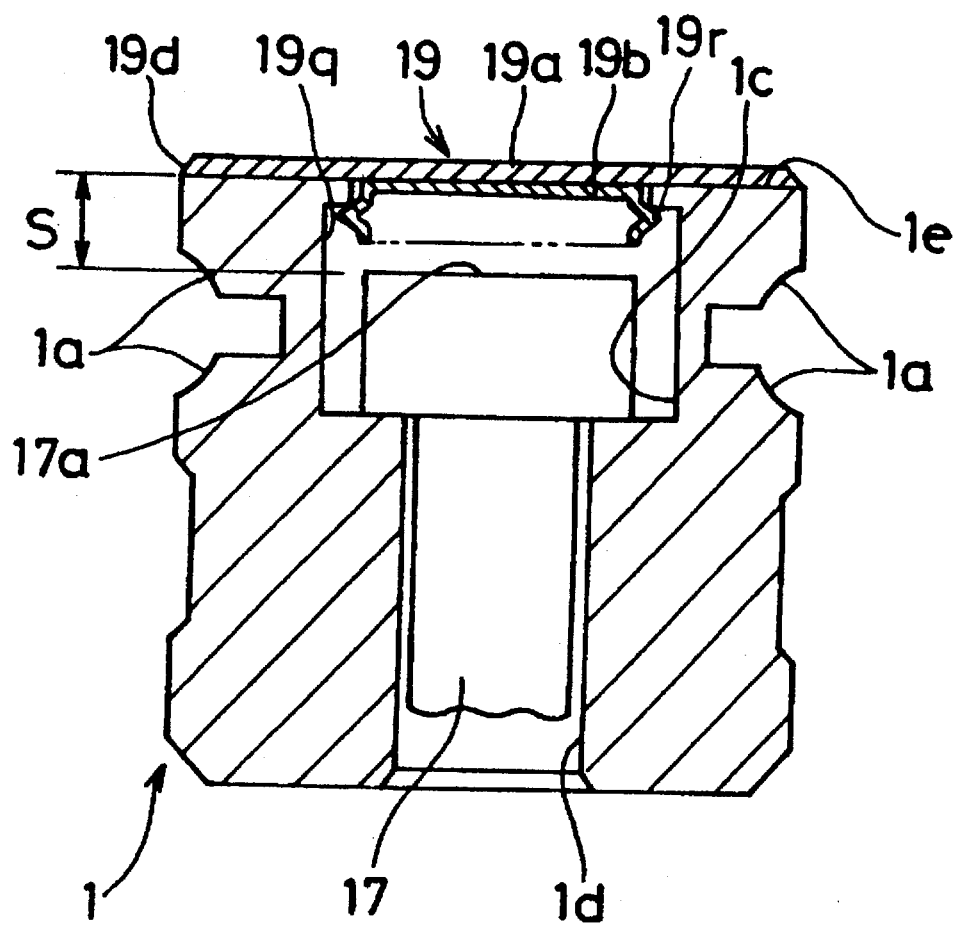
FIG. 16 is a vertical cross-sectional view of a track rail and top cover that are essential portions of another linear motion rolling guide unit of the above-mentioned fourth embodiment.

Next, the following provides an explanation of the essential portion of a linear motion rolling guide unit as a fourth embodiment of the present invention based on FIGS. 15 and 16.

As shown in the drawings, in the present embodiment, ring-shaped indentations 19o (FIG. 15) and 19q (FIG. 16) are formed in the inner surface of countersunk portion 1c, which is a portion of the insertion hole formed in track rail 1 into which bolt 17 is inserted, that lock engaging portion 19b. Projections 19p (FIG. 15) and 19r (FIG. 16) are formed on engaging portion 19b that fit into these indentations 19o and 19q.

The above-mentioned indentations 19o and 19q differ in that indentation 19o is in the form of a groove, while indentation 19q is in the form of a wide band.

In the above-mentioned fourth embodiment, since indentation 19o or 19q is formed in the inner surface of the fastening member insertion hole provided in track rail 1 and locks engaging portion 19b, and projection 19p or 19r can also be formed in engaging portion 19b to engage with said indentation, the fastening of top cover 19 to track rail 1 is made even more rigid, thereby resulting in excellent vibration and impact resistance.

In the linear motion rolling guide unit of each of the embodiments described above, a slider in the form of slide unit 3 able to perform relative motion with respect to track rail 1 has casing 6 (shown in FIG. 6), in which a load bearing track groove (2a:see FIG. 2) corresponding to track groove 1a of said track rail 1 and return path (2b:see FIG. 2) roughly parallel to it are formed, and end caps 7a and 7b (see FIG. 6), in which direction changing paths (2c, 2d:see FIG. 2), which together with said load bearing track groove and return path form rolling element circulating path 2 (see FIG. 6 and FIG. 2), are formed and which are coupled to both ends in the direction of progress of said casing 6, and a plurality of rolling elements in the form of balls 4 (see FIG. 6) are arranged and contained in said rolling element circulating path 2 that bear the load by circulating while rolling over track surface 1a of track rail 1. Namely, this guide unit is of the so-called rolling type in which slide unit 3 slides by means of circulation of balls 4. Since the constitution and operation of this rolling type is precise, it is particularly susceptible to the entry of dust and so forth, thus making the application of the present invention to this effective.

Furthermore, in each of the embodiments described above, although balls 4 circulate within said slide unit accompanying sliding of slide unit 3, these embodiments are not limited to this constitution, but rather the present invention may naturally also be applied to guide units having other constitutions. In addition, although balls are used for the rolling elements in each of the above-mentioned embodiments, a constitution may also be employed that uses rollers.

Moreover, although a linear motion rolling guide unit that operates linearly is shown as a rolling guide unit in each of the above-mentioned embodiments, this rolling guide unit may naturally be of the curved type in which the track rail and so forth is given curvature.

In addition, the present invention is not limited to the constitutions of each of the previously described embodiments, but naturally a diverse range of constitutions can be realized by suitably combining or mutually applying individual portions of the constitutions included in each of these embodiments.

As has been explained above, according to the present invention, by engaging the engaging portion of a top cover with insertion holes formed as fastening member insertion holes in a track rail, the top cover is fastened to the track rail. In this manner, since a constitution is employed that performs fastening of a top cover by using fastening member insertion holes of a track rail, processing for attaching the top cover is not required to be performed on the track rail, and fasteners or adhesive for attaching the top cover are not required, thus reducing the number of processing and assembly steps to achieve reduced costs.

In addition, according to this constitution, in the case of fabricating guide units of various lengths, by preparing in advance a long top cover in which a large number of the above-mentioned engaging portions are arranged in a row and then suitably cutting into lengths of the track rails equipped on each guide unit to be fabricated, there is no need to individually fabricate various top covers of different lengths. The number of processing steps and costs are also reduced with respect to this point.

Moreover, according to the above-mentioned constitution, in the case it becomes necessary to replace a top cover already installed on a track rail due to being damaged by some cause, said top cover can be removed from the track rail by lifting up said top cover such that the engaging portions of said top cover are pulled out of the insertion holes of said track rail, while a new top cover can be attached by using the reverse procedure, namely by inserting the engaging portions into the above-mentioned insertion holes, to complete the replacement procedure. Thus, replacement can be performed both easily and rapidly.

In addition, since the top cover of the above-mentioned constitution can be installed on a track rail as described above without requiring any special processing, it can be installed later on the above-mentioned track rail already installed on a machine tool and so forth.

In addition, in the top cover according to the present invention, although the engaging portion provided so as to engage with the fastening member insertion holes of a track rail has a diameter larger than said insertion holes, it is able to fit into said insertion holes by elastic deformation. Thus, mounting of the top cover to the track rail is relatively rigid, and prevents said top cover from being released despite the application of a certain degree of vibrations and impact.

In addition, in the top cover according to the present invention, the above-mentioned engaging portion is juxtaposed between the top surface of a fastening member inserted into the above-mentioned insertion hole and the location of the surface of the track rail. Namely, since the space that forms as the above-mentioned so-called plug space in said insertion hole is used as space for containing said engaging portion, processing for additionally expanding the diameter, depth and so forth of said insertion hole is not required, thus eliminating the incurrence of costs with respect to this point as well.

Moreover, in the top cover according to the present invention, the above-mentioned engaging portion is formed separately from the body portion of said top cover, and attached to said body portion. According to this constitution, since said body portion and engaging portion are coupled after forming said body portion and engaging portion as separate parts, although the number of fabrication steps increases slightly, since each part has a simple shape and their respective formation is extremely simple, production can be performed with small-scale equipment. In addition, on the basis of this constitution, said engaging portion is able to move slightly in at least either the lengthwise direction or width direction of said body portion. Thus, even in the case there is a relatively large error in the pitch and so forth between each insertion hole arranged in a row in a track rail, each engaging portion can be fit into each insertion hole as a result of being guided by said insertion holes due to each engaging portion being able to move as described above, thus preventing the occurrence of defective fitting.

Next, in the top cover according to the present invention, the body portion and engaging portion of said top cover may be molded as a single unit using synthetic resin. In this constitution, the top cover can be formed all at once, thus resulting in a significant reduction in the number of fabrication steps.

The constitution indicated below is employed as a specific example of the above-mentioned engaging portion of the top cover according to the present invention.

Namely, the above-mentioned engaging portion is roughly in the shape of a cylinder with its one end being closed, and together with the diameter gradually increasing from its closed end towards its open end, said diameter gradually becomes narrower starting from a prescribed location so that the outer diameter of said prescribed location is larger than the inner diameter of the above-mentioned insertion holes, and a plurality of slits are arranged in a row in the circumferential direction that open towards the above-mentioned open end in parallel with the axial direction. The engaging portion of said form can be easily fabricated by press processing using various materials such as thin sheet steel, which together with realizing low costs, enables resilient engaging strength to be easily obtained with respect to the above-mentioned insertion holes.

In addition, in the top cover according to the present invention, the body portion of said top cover has a bent extending portion extending from both side edges of the top surface of a track rail to the upper portion of a side surface. As a result, entry of dust and so forth from both sides of the top cover is prevented, thereby improving dust prevention effects.

In addition, in the top cover according to the present invention, the surface of the body portion of said top cover is colored. Thus, in addition to obtaining an attractive appearance, the additional effect is obtained wherein different types of said top cover can be distinguished by color coding.

On the other hand, in the track rail unit and guide unit according to the present invention, indentations are formed in the inner surface of fastening member insertion holes provided in a track rail that lock the engaging portion of a top cover. For this reason, the fastening of the top cover to the track rail is made even more rigid, thereby resulting in excellent vibration and impact resistance.

In addition, in the drive unit according to the present invention, a slider able to perform relative motion with respect to a track rail has a casing, in which a load bearing track corresponding to a track of said track rail and return path roughly parallel to it are formed, and end caps, in which direction changing paths, which together with said load bearing track and return path form a rolling element circulating path, are formed and which are coupled to both ends in the direction of progress of said casing, and a plurality of rolling elements are arranged and contained in said rolling element circulating path that bear the load by circulating while rolling over said track surface of the track rail. Namely, this guide unit is of the so-called rolling type in which the slider slides by means of circulation of rolling elements. Since the constitution and operation of this rolling type is precise, it is particularly susceptible to the entry of dust and so forth, thus making the application of the present invention to this effective.

What is claimed is:

1. A top cover composed of a body portion extending along the lengthwise direction of a track rail that covers insertion holes formed in said track rail for insertion of fastening members for fixing on a prescribed base, and an engaging portion that engages with said insertion holes to mount said body portion on said track rail.

2. The top cover as set forth in claim 1 wherein said engaging portion has a diameter larger than said insertion holes, and is fit into said insertion holes by elastic deformation.

3. The top cover as set forth in claim 1 wherein said engaging portion is juxtapositioned between the top surface of fastening members inserted into said insertion holes and the location of the surface of said track rail.

4. The top cover as set forth in claim 1 wherein said engaging portion is formed separately from the body portion of said top cover and is attached to said body portion.

5. The top cover as set forth in claim 4 wherein said engaging portion is able to move in at least either the lengthwise direction or width direction of said body portion with respect to said body portion.

6. The top cover as set forth in claim 1 wherein the body portion and engaging portion of said top cover are mutually molded as a single unit using synthetic resin.

7. The top cover as set forth in claim 1 wherein said engaging portion is roughly in the shape of a cylinder with its one end being closed, and together with the diameter gradually increasing from its closed end towards its open end, said diameter gradually becomes narrower starting from a prescribed location so that the outer diameter of said prescribed location is larger than the inner diameter of said insertion holes, and a plurality of slits are arranged in a row in the circumferential direction that open towards said open end in parallel with the axial direction.

8. The top cover as set forth in claim 1 wherein the body portion of said top cover has a bent extending portion extending from both sides edges of the top surface of said track rail to the upper portion of the side surface.

9. The top cover as set forth in claim 1 wherein the surface of the body portion of said top cover is colored.

10. A track rail unit composed of a track rail in which a track is formed along the lengthwise direction and in which insertion holes for insertion of fastening members for fixing on a prescribed base are arranged in a row in the lengthwise direction, and a top cover comprising a body portion extending along the lengthwise direction of said track rail that covers said insertion holes, and an engaging portion that engages with said insertion holes to mount said body portion on said track rail.

11. The track rail unit as set forth in claim 10 wherein indentations that lock said engaging portion are formed in the inner surface of said insertion holes.

12. A guide unit composed of a track rail, in which a track is formed along the lengthwise direction and in which insertion holes for insertion of fastening members for fixing on a prescribed base are arranged in a row in the lengthwise direction, a slider able to perform relative movement with respect to said track rail, and a top cover comprising a body portion extending along the lengthwise direction of said track rail that covers said insertion holes, and an engaging portion that engages with said insertion holes to mount said body portion on said track rail.

13. The guide unit as set forth in claim 12 wherein indentations that lock said engaging portion are formed in the inner surface of said insertion holes.

14. The guide unit as set forth in claim 12 wherein said slider has a casing, in which a load bearing track corresponding to a track of said track rail and return path roughly parallel to it are formed, and end caps, in which direction changing paths, which together with said load bearing track and return path form a rolling element circulating path, are formed and which are coupled to both ends in the direction of progress of said casing, and is equipped with a plurality of rolling elements arranged and contained in said rolling element circulating path that bear the load by circulating while rolling over said track.

* * * * *